US007816619B2

(12) United States Patent
Jaksic

(10) Patent No.: US 7,816,619 B2
(45) Date of Patent: Oct. 19, 2010

(54) METHODS AND APPARATUS FOR MANUFACTURING CARBON NANOTUBES

(75) Inventor: Nebojsa Ilija Jaksic, Pueblo, CO (US)

(73) Assignee: Nebojsa Jaksic, Pueblo, CO (US)

( * ) Notice: Subject to any disclaimer, the term of this patent is extended or adjusted under 35 U.S.C. 154(b) by 372 days.

(21) Appl. No.: 11/689,457

(22) Filed: Mar. 21, 2007

(65) Prior Publication Data

US 2008/0296147 A1 Dec. 4, 2008

(51) Int. Cl.
*B23H 1/00* (2006.01)
*D01F 9/12* (2006.01)
*C01B 31/00* (2006.01)

(52) U.S. Cl. ............... 219/69.17; 204/173; 219/69.11; 977/844

(58) Field of Classification Search ............. 219/69.1, 219/69.11, 69.17, 69.14, 69.15; 977/844; 204/164, 173

See application file for complete search history.

(56) References Cited

U.S. PATENT DOCUMENTS

| 354,310 | A | * | 12/1886 | Edison | ............. 204/173 |
| 2,778,925 | A | * | 1/1957 | Gross et al. | ............. 219/69.15 |
| 3,679,867 | A | | 7/1972 | Stayner | |
| 4,103,137 | A | * | 7/1978 | Levitt et al. | ............. 219/69.12 |
| 4,242,557 | A | * | 12/1980 | Sato et al. | ............. 219/69.17 |
| 4,459,453 | A | * | 7/1984 | Inoue | ............. 219/69.17 |
| 4,577,082 | A | * | 3/1986 | Inoue | ............. 219/69.14 |
| 5,049,257 | A | * | 9/1991 | Furukawa | ............. 219/69.14 |
| 5,085,247 | A | * | 2/1992 | Higashi | ............. 219/69.12 |
| 5,332,529 | A | | 7/1994 | Mead | |
| 5,369,240 | A | * | 11/1994 | Itoh | ............. 219/69.15 |
| 5,648,122 | A | * | 7/1997 | Rao et al. | ............. 219/69.17 |
| 5,753,088 | A | | 5/1998 | Olk | |

(Continued)

FOREIGN PATENT DOCUMENTS

GB       2220162 A     *    1/1990

(Continued)

OTHER PUBLICATIONS

Antisari, M. V., Marazzi, R., Krsmanovic, R., "Synthesis of multiwall carbon nanotubes by electric arc discharge in liquid environments," Carbon 41, 2003, pp. 2393-2401, Elsevier Ltd., UK.

Lange, H., Sioda, M., Huczko, A., Zhu, Y. Q., Kroto, H. W., Walton D. R. M., "Nanocarbon production by arc discharge in water," Carbon 41, 2003, pp. 1617-1623, Elsevier Ltd., UK.

(Continued)

*Primary Examiner*—Geoffrey S Evans

(57) ABSTRACT

A process for manufacturing carbon nanotubes, including a step of creating an electric arc in an electric field between a carbonaceous anode and a carbonaceous cathode under conditions effective to produce the carbon nanotubes, wherein the carbonaceous anode and the carbonaceous cathode are immersed in dielectric liquid serving as a dielectric, coolant and for providing an oxygen-free environment. Preferably, one of the electric discharge machining dielectric oils is used as dielectric liquid. Preferably, an electric discharge machine is used to immerse the electrodes in the dielectric liquid, create an electric field, induce the arc, and adjust the gap between the electrodes thus optimizing the yield of carbon nanotubes. The process is cost-effective, easy to implement, and provides high-quality carbon nanotubes while eliminating the need for dedicated equipment and catalysts.

14 Claims, 2 Drawing Sheets

U.S. PATENT DOCUMENTS

| | | | |
|---|---|---|---|
| 5,773,782 A * | 6/1998 | Storr et al. | 219/69.14 |
| 5,876,684 A | 3/1999 | Withers | |
| 6,645,438 B1 | 11/2003 | Dubrovski | |
| 6,740,224 B1 | 5/2004 | Benavides | |
| 6,884,404 B2 | 4/2005 | Anazawa | |
| 6,884,405 B2 | 4/2005 | Ryzhkov | |
| 7,008,605 B1 | 3/2006 | Benavides | |
| 2007/0018158 A1* | 1/2007 | Nagashima et al. | 257/48 |

FOREIGN PATENT DOCUMENTS

| | | | |
|---|---|---|---|
| JP | 4-322911 A | * | 11/1992 |
| JP | 2002-346836 A | * | 12/2002 |
| JP | 2005-247677 A | * | 9/2005 |

OTHER PUBLICATIONS

Li, X., Xhu, H., Jiang, B., Ding, J., Xu, C., Wu, D., "High-yield synthesis of multi-walled carbon nanotubes by water-protected arc discharge method," Letters to the Editor/Carbon 411, 2002, pp. 1645-1687, Elsevier Ltd., UK.

Montoro, L. A., Lofrano, R. C. Z., Rosolen, J. M., "Synthesis of single-walled and multi-walled carbon nanotubes by arc-water method," Letters to the Editor / Carbon 43, 2005, pp. 195-213, Elsevier Ltd., UK.

Wang, S-D., Chang, M-H., Lan, K. M-D., Wu, C-C., Cheng, J-J., Chang, H-K., "Synthesis of carbon nanotubes by arc discharge in sodium chloride solution," Letters to the Editor / Carbon 43, 2005, pp. 1778-1814, Elsevier Ltd., UK.

* cited by examiner

METHODS AND APPARATUS FOR MANUFACTURING CARBON NANOTUBES

The present invention relates to structures made of elemental carbon, and more specifically to carbon nanotubes. It relates especially to a method of manufacturing carbon nanotubes using arc discharge in dielectric liquids.

BACKGROUND OF THE INVENTION

Description of Prior Art

Since their discovery in 1991 by Sumio Iijima, carbon nanotubes, an allotropic form of carbon, have drawn significant attention from scientific community due to their extraordinary physical properties and a wide range of potential applications. The basic form of carbon nanotubes is a rolled sheet of graphite forming a seamless cylinder consisting of a hexagonal network of carbon atoms capped at both ends by a half of a fullerene molecule. A fullerene molecule is a closed hollow carbon molecule consisting of twelve pentagonal faces and a number of hexagonal faces. Carbon nanotubes can be divided into multi wall carbon nanotubes and single wall carbon nanotubes. A single wall carbon nanotube has only one layer in the carbon lattice while a multi wall carbon nanotube consists of multiple layers.

There are three common methods for production of carbon nanotubes. These are arc discharge, laser ablation and chemical vapor deposition. They all require expensive equipment like a water-cooled pressurized chamber for the arc discharge method, a powerful laser for the laser ablation method and a high temperature specialized furnace for the chemical vapor deposition method. In general, for single wall carbon nanotube production, the above methods use catalysts which need to be removed at the end of the process, thus increasing the production cost.

The synthesis of carbon nanotubes in experimental quantities using the traditional arc discharge method was available for a number of years. It consists of the following steps. Two water-cooled carbonaceous electrodes are placed approximately one millimeter apart within a vacuum chamber. Air is evacuated from the vacuum chamber to a pressure of about $10^{-7}$ Torr. The chamber is filled with an inert gas (or a combination thereof) such as helium, argon, nitrogen or hydrogen to a pressure ranging from about 50 to 500 mTorr. An electric arc is struck between the electrodes. A gap between the electrodes of about one millimeter is maintained for the duration of the process, while the material from the anode in part is deposited on the cathode. This hard, cylindrical deposit on the cathode rich with carbon nanotubes is collected at the end of the process. A DC voltage of about 18 V is applied between the electrodes during the arc discharge. This process is slow and it does not yield to mass production of carbon nanotubes. Furthermore, the process requires specialized expensive equipment and an inert atmosphere.

Olk (U.S. Pat. No. 5,753,088, Issued May 19, 1998, Method for Making Carbon Nanotubes) disclosed a simplified method for production of carbon nanotubes by immersing carbonaceous electrodes in a liquefied gas like nitrogen, hydrogen, helium, argon or the like thus eliminating vacuum chamber and an inert gas atmosphere. However, the vacuum chamber of the previous art is replaced by an insulated vessel adapted to hold liquefied gas thus increasing the cost of the apparatus. In addition, the inert liquefied gas is used as a consumable material (vaporizes strongly) consequently further increasing the cost of the process. Finally, when this liquefied gas evaporates, it carries with it a large amount of carbonaceous material into the atmosphere creating a health hazard for production personnel.

Similar methods for synthesis of carbon nanotubes in experimental quantities by immersing carbonaceous electrodes in water (Antisari, M. V. et al., Carbon 41, 2393-2401, 2003, Lange, H. et al., Carbon 41, 1617-1623, 2003, Li, X. et al., Carbon 411, 1645-1687, 2002, Montoro, L. A. et al., Carbon 43, 195-213, 2005) or an aqueous solution such as NaCl (Wang, Sh-D., Carbon 43, 1778-1814, 2005) or vanadic acid $H_3VO_4$ (Montoro, L. A. et al., Carbon 43, 195-213, 2005) using arc discharge are recently reported. While attractive as a cooling medium, water causes erratic arc discharge making the control of the electrode gap distance difficult. In addition, during the arc discharge process, water reacts with carbon producing carbon monoxide (requiring additional safety measures) and hydrogen gas which is known to lower the yield of carbon nanotubes. Aqueous solution of NaCl stabilizes arc discharge but limits the synthesis to multi wall carbon nanotubes and introduces carbon ribbons requiring additional purification steps. Vanadic acid solution requires somewhat cumbersome steps in preparing the solution thus increasing the cost of the process.

Benavides et al. in U.S. Pat. No. 6,740,224 B1, Issued May 25, 2004, Method of Manufacturing Carbon Nanotubes disclosed a method for production of carbon nanotubes where a welder is used to induce an electric current via an arc welding process between two carbonaceous electrodes. The anode, acting as a source of carbon for carbon nanotubes, is water-cooled by the welder cooling system while the cathode is only partially immersed in a tank of water (or other liquids like ice water, dry ice or liquid nitrogen as disclosed by Benavides in U.S. Pat. No. 7,008,605 B1, Issued Mar. 7 2006, Method for Manufacturing High Quality Carbon Nanotubes) for cooling. However, this process is also executed in an atmosphere of a flowing inert gas, such as helium at a pressure of about 50 psig. Apart from a specialized welder, the process requires a helium source and a constant helium flow thus increasing the complexity of the apparatus and increasing the manufacturing cost of carbon nanotubes.

Ryzhkov (Ryzhkov, V. A., U.S. Pat. No. 6,884,405 B2, Issued Apr. 26, 2005, Method and Device for Producing Higher Fullerenes and Nanotubes) uses a complex water-cooled hermetically-sealed apparatus with specially-made self-regulating electrodes submerged fully in an aromatic hydrocarbon liquid to produce carbon nanotubes via arc discharge method. The main source of carbon for carbon nanotubes is said aromatic hydrocarbon liquid, not the anode, and the method used is the cracking of said liquid resulting in production of acetylene and carbon vapor. In addition, an inert gas (argon) flow is added for regulating gaps between multiple electrodes during the arc discharge process. Other hydrocarbon liquids like petrol are discouraged from use since they create larger amounts of hydrogen during cracking. High manufacturing cost of carbon nanotubes is dictated by the complicated apparatus, special electrodes, cracking aromatic hydrocarbon liquids used mainly as a source of carbon, production of acetylene as a byproduct of chemical reactions and the inert gas flow for electrode gap regulation. In addition, most of the aromatic hydrocarbons such as toluene or benzene are carcinogenic.

Others in the art crack carbonaceous liquids used as a carbon source with arc discharge for fullerene and/or carbon nanotube production. Anazawa et al. in U.S. Pat. No. 6,884,404 B2, Issued Apr. 26, 2005, Method of Manufacturing Carbon nanotubes and/or Fullerenes, and Manufacturing Apparatus for the Same disclose supplying a carboniferous liquid state material (petroleum liquid, acetone, kerosene, mineral oil or fatty acid ester) as a mist to the discharge plasma through an introduction tube. However, the apparatus for practicing this invention is complicated requiring a vacuum chamber, a gas supply unit and a raw material supply unit. In addition, the process is slow since it requires opening the vacuum chamber to retrieve the soot. In one embodiment of his invention, Dubrovsky in U.S. Pat. No. 6,645,438 B1, Issued Nov. 11, 2003, Method and Apparatus for Producing Fullerenes in Large Quantities from Liquid Hydrocarbons submerges two graphite electrodes in used motor oil, strikes an electric arc at applied voltage of about 200 V (much higher than the voltage range for production of carbon nanotubes) and currents ranging from 160 to 200 A, and then maximizes the gap distance to about 10 mm. Cracking reaction produces only liquid solution of soot containing fullerenes requiring additional purification and separation steps. The disclosed invention also produces only fullerenes (there is no mentioning of carbon nanotubes while fullerenes are defined as carbon structures consisting of even number of carbon atoms from 60 to 960) and uses a complicated water-cooled reaction apparatus and a complex mechanism for electrode separation. While specifically avoiding graphite rod electrodes as a source of carbon, Withers et al. in U.S. Pat. No. 5,876,684, issued Mar. 2, 1999, Methods and Apparati for Producing Fullerenes in 36 examples disclose production of fullerenes from carbon powder, carbon particulates, hydrocarbon gas and/or hydrocarbon liquid.

Arc discharge methods are lucrative since they produce high-quality carbon nanotubes. These carbon nanotubes have fewer defects and can withstand higher temperatures before decomposing than the ones produced by other means. For example, arc-discharge produced carbon nanotubes may decompose at about 650° C. while carbon nanotubes produced by other means typically decompose at about 500° C. Current directions in carbon nanotube production improvements using arc discharge methods point towards simpler automated apparati for increased production and a more suitable production medium.

Electric discharge machining (invented in 1940's) is one of the most widely used nontraditional metal removal processes whereby an electric arc is struck between two electrodes (one denoted as work electrode and another as workpiece) submerged in a dielectric liquid. Material is removed from the workpiece in the shape of the work electrode. The arc created between the work electrode and the workpiece vaporizes material on the surface of the workpiece and the dielectric liquid flushes it away. Most often, the work electrode (cathode) is connected to the negative polarity of a direct current (DC) or pulsating DC power supply. In some cases when the removing material is steel, the work electrode wear can be minimized by changing the polarity of the work electrode to positive (anode). However, this action lowers significantly the material removal rate. While the work electrodes are sometimes made of graphite, the workpieces are not because such workpieces could be easily machined by traditional means at a lower cost. Therefore, it is not practical to have both electrodes (the work electrode and the workpiece) made of graphite or other carbonaceous material.

Mass-produced apparati using electric discharge for material removal are electric discharge machines (EDMs). Since the invention of the process, much effort was spent on apparatus, electrodes and dielectric medium development. Automated operation of EDMs including 3-dimensional contouring and computer controls is well established in the art.

Dielectric liquids like water, kerosene, glycols, diesel fuel, dielectric oils by Rust-Lick, Incorporated such as RUSTLICK EDM-30, RUSTLICK EDM-250 and RUSLTICK EDM-500, dielectric oils by Commonwealth Oil Corp. such as EDM 244, EDM 259 and EDM Super Supreme, and other dielectric oils (Stayner, R. A., U.S. Pat. No. 3,679,857, Issued Jul. 25, 1972, Stable Dielectric Fluid for Electrical Discharge Machining Comprising a Mineral Oil, a Metal Sulfonate and a Phenolic Antioxidant and Mead et al., U.S. Pat. No. 5,332,529, Issued Jul. 26, 1994, Electric Discharge Machine Process and Fluid) have been used in EDMs. Preferred characteristics of a dielectric liquid for electric discharge machining are high dielectric strength (usually above 8 KV), high thermal transfer (cooling) capabilities, resistance to oxidation (should provide a chemically-stable oxygen-free environment), high flash point (should not ignite during normal operating conditions), low viscosity, low toxicity, and freedom from acid, alkali and corrosive sulfur.

It would be advantageous to have a simple, low-cost, safe method of manufacturing carbon nanotubes (both single wall and multi wall) in large quantities that is easy to implement by using the development results from an existing technological base. It would be further advantageous to have a simple, fast and safe method of manufacturing carbon nanotubes from carbonaceous electrode material using electric arc discharge in a suitable dielectric liquid. It would be further advantageous if the carbon nanotubes could be manufactured using a simple or an already existent, mass-produced and widely available apparatus such as electric discharge machine.

OBJECTS AND ADVANTAGES

It is an object of the present invention to provide a process for manufacturing high-quality carbon nanotubes.

It is another object of the present invention to provide a process for manufacturing high-quality single wall carbon nanotubes.

It is a further object of the present invention to provide a simple, inexpensive, catalyst-free process for manufacturing carbon nanotubes.

It is still a further object of the present invention to provide a process for manufacturing carbon nanotubes in a dielectric liquid such as a typical electric discharge machining dielectric liquid used as a dielectric, coolant, and oxygen-free environment.

It is still a further object of the present invention to provide a process for manufacturing carbon nanotubes using electric discharge machines.

To achieve these objects of the invention, a process for manufacturing of carbon nanotubes is provided, comprising a step of inducting electrical current through a carbonaceous anode and a carbonaceous cathode under conditions effective to produce the carbon nanotubes. Preferably, both electrodes are immersed in a dielectric liquid. Preferably, the dielectric liquid is one of the dielectric liquids typically used in electric discharge machining having a set of preferred characteristics mentioned earlier. Preferably, the process is implemented by using an electric discharge machine.

The present process can manufacture high-quality carbon nanotubes from carbonaceous electrode material while eliminating the need for (a) a closed or pressurized chamber, (b) separate subsystems for cooling of electrodes, (c) an inert gas atmosphere around electrodes in the reaction area and (d) a catalyst. Therefore, the present process avoids the costly and potentially hazardous steps that have heretofore compromised other carbon nanotube manufacturing processes.

BRIEF SUMMARY OF THE INVENTION

In accordance with one embodiment of the present invention a method for production of carbon nanotubes using arc discharge between two carbonaceous electrodes immersed in dielectric liquid is disclosed. In accordance with the practice of the invention, carbonaceous electrodes are used as a source of carbon for production of carbon nanotubes and the dielectric liquid is used as a dielectric, coolant and oxygen-free environment. In accordance with another embodiment of the present invention the dielectric liquid used is one of the liquids used typically in the electric discharge machining process such as EDM dielectric oil. According to another embodiment of the present invention electric discharge machines are disclosed as means for practicing the invention. According to the embodiments of the present invention DC or pulsating DC is used for production of carbon nanotubes.

BRIEF DESCRIPTION OF THE SEVERAL VIEWS OF THE DRAWING

Other objects and advantages of the present invention will become apparent from a detailed description of preferred embodiments of the invention which follows. Reference will be had to the accompanying drawings in which.

DRAWINGS—REFERENCE NUMERALS

2—linear slide housing
4—sliding assembly
6—knob
8—lead screw
10—dielectric liquid tank
12—dielectric liquid
13—dielectric oil
14—cathode holder with an electric connector
16—cathode
18—anode
20—gap
22—anode holder with an electric connector
24—power supply
26—electrical wiring
28—servo
30—servo controller
32—dielectric liquid reservoir
34—pump
36—filter
38—intake hose
40—outtake hose
42—valve

DETAILED DESCRIPTION OF THE PREFERRED EMBODIMENTS

Figure 1:
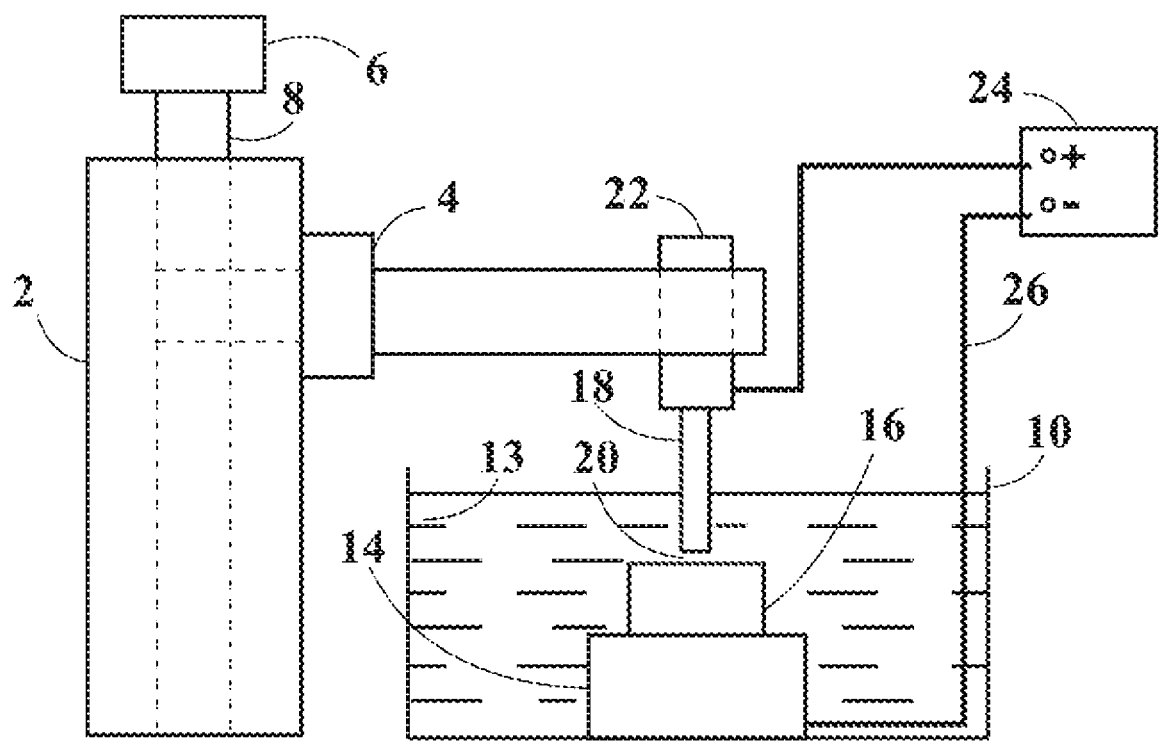
FIG. 1 is a schematic view of an apparatus prepared for the production of carbon nanotubes in dielectric oil according to the present invention.

FIG. 1 is a schematic illustration of an apparatus suitable for the practice of the present invention. The apparatus comprises a dielectric liquid tank 10 containing dielectric oil 13. A cathode holder with an electric connector 14 holding a carbonaceous cathode 16 and electrically connecting said cathode with a power supply 24 via electrical wiring 26 is placed on the bottom of dielectric liquid tank 10. Cathode 16 is fully immersed in dielectric oil 13. A carbonaceous anode 18 is submerged into said dielectric oil opposite cathode 16 thus creating a gap 20. Anode 18 is held by an anode holder with an electric connector 22 for quick anode changes and connecting anode 18 to power supply 24 via electrical wiring 26. The length of gap 20 between electrodes 16 and 18 during the arc discharge is controlled by a linear stage consisting of a linear slide housing 2, a sliding assembly 4 connected to anode holder with an electric connector 22, and a knob 6 connected to a lead screw 8. By turning said knob, said lead screw turns, which consequently moves sliding assembly 4, anode holder with an electric connector 22 and anode 18 thus changing the length of gap 20.

It is relatively easy for one skilled in the art to replace the linear stage by automatic means for controlling the gap distance based on various sensory outputs from the arc discharge process such as but not limited to gap voltage and/or arc intensity.

Figure 2:
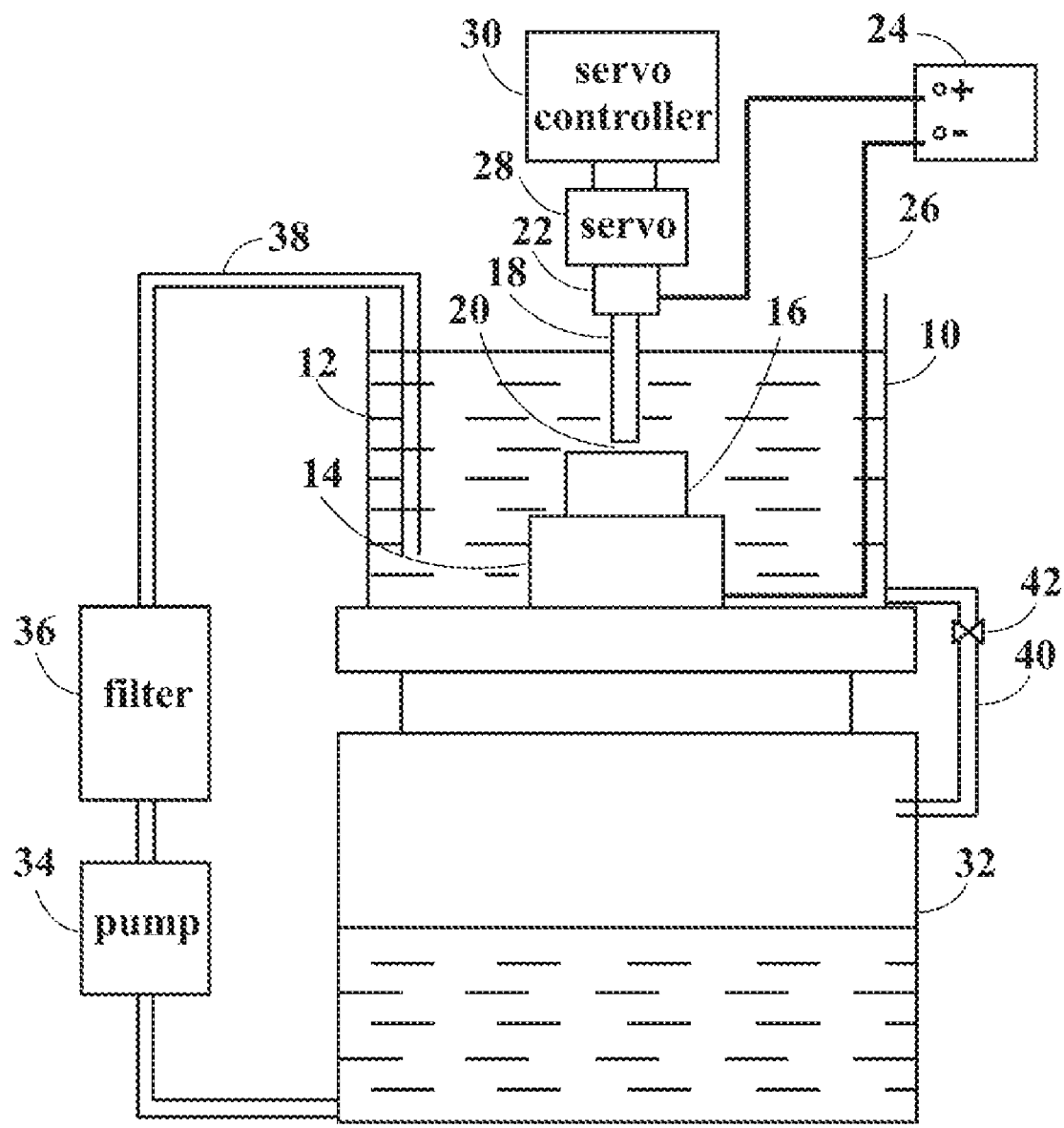
FIG. 2 is a schematic view of an electric discharge machine prepared to practice the process of the present invention.

FIG. 2 is a schematic illustration of a mass-produced apparatus (an electric discharge machine) suitable for the practice of the present invention. An electric discharge machine comprises a dielectric liquid tank 10 containing dielectric liquid 12. A cathode holder with an electric connector 14 holding a cathode 16 and electrically connecting said cathode with a power supply 24 via electrical wiring 26 is placed on the bottom of dielectric liquid tank 10. Cathode 16 is fully immersed in dielectric liquid 12. An anode 18 is submerged into dielectric liquid 12 opposite cathode 16 thus creating a gap 20. Said anode is held by an anode holder with an electric connector 22 for quick anode changes and connecting said anode to power supply 24 via electrical wiring 26. The length of gap 20 between cathode 16 and anode 18 during an arc discharge is controlled by a servo 28 and a servo controller 30. Dielectric liquid 12 is pumped into dielectric liquid tank 10 from a dielectric liquid reservoir 32 by using a pump 34, a filter 36 and an intake hose 38. At the end of the process, the return of dielectric liquid 12 into dielectric liquid reservoir 32 is accomplished via an outtake hose 40 by opening a valve 42.

According to FIG. 1 and FIG. 2 a voltage of about 15 V to about 40 V, preferably from about 18 V to about 36 V, is applied to the two carbonaceous electrodes (cathode 16 and anode 18) immersed in dielectric liquid 12. Then, the electrodes are brought to the close proximity of each other until an electric arc is struck. Then, gap 20 of from about 0.3 mm to about 5 mm, preferably from about 0.5 mm to about 2 mm, is maintained for the duration of the process. A DC with density of from about 1 $A/mm^2$ to about 2 $A/mm^2$, or a pulsating DC with current density from about 0.25 $A/mm^2$ to about 2 $A/mm^2$ is applied.

The created electric arc vaporizes the carbonaceous anode. The carbon from anode 18 forms a hard deposit on the surface of cathode 16. The deposit can be removed, ground, and purified easily. The present inventor used a mortar and a pestle to grind the deposit, and then placed such deposit into a glass vial containing acetone, and then sonicated the suspension for about 2 minutes.

The present inventor has completed several runs in accordance with the process of the present invention. Carbon nanotubes produced by the present process have been subjected to a preliminary material characterization using transmission electron microscopy (TEM) confirming carbon nanotube rich material in the deposit.

By adjusting one or more process conditions of the present invention, such as the applied voltage, applied current, gap size, electrode dimensions, electrode density, and dielectric material properties, the process can be optimized for maximum yield of the desired type (single wall, multi wall, conductive or semiconductive) and size of carbon nanotubes.

The following examples present detailed descriptions of two embodiments of the present process. These detailed descriptions fall within the scope of, and serve to exemplify, the more generally described process set forth above. The examples are presented for illustrative purposes only, and are not intended as a restriction on the scope of the invention.

EXAMPLE 1

A variable voltage, variable DC power source was used to induce a high electric current during the arc discharge between two carbonaceous electrodes immersed in dielectric oil.

The setup, as depicted in FIG. 1, comprised an HP 6267B as power supply 24 connected to a cylindrical EDM graphite piece (POCO Graphite EDM-1) from a used EDM electrode of about 25.4 mm (1 inch) diameter and about 12.7 mm (½ inch) height as cathode 16, an about 3.175 mm (⅛ inch) diameter and about 101.6 mm (4 inch) length graphite rod as anode 18; a 600 ml Pyrex glass beaker used as dielectric liquid tank 10 containing dielectric oil 13 by Rust-Lick Inc., RUSTLICK EDM-500; and a linear stage (made by Edmund Scientific) of about 152.4 mm (6 inch) length and with about 101.6 mm (4 inch) travel length and including a lead screw of about 0.787 threads/mm (20 threads/inch) as lead screw 8.

RUSTLICK EDM-500 dielectric oil exhibits the following preferable properties: high dielectric constant of about 60 kV making it an excellent dielectric; high thermal transfer (low viscosity of about 3.17 cSt. at 40° C., specific gravity of about 0.8012 at 25 ° C., and high cooling rate of about 3270° C./s) making it an excellent coolant; and high oxidation resistance making it a chemically-stable oxygen-free environment for carbon nanotube manufacturing. In addition, RUSTLICK EDM-500 is one of the dielectric oils with low content of aromatic hydrocarbons (aromatic content of about 0.0001%) without additives thus making it non-carcinogenic.

After adjusting the voltage between the electrodes from about 18 V to about 36 V and setting the maximum current to about 8 A (about 1 A/mm$^2$ current density) an electric arc is struck between cathode 16 and anode 18. Then, the arc is maintained through adjustments of gap 20 between said electrodes by manually turning knob 6 of lead screw 8 attached to anode holder with an electric connector 22. After about 5 minutes the process is stopped (Pyrex glass beaker was warm to the touch), a formed deposit from the cathode is removed, ground and sonicated in acetone solution. TEM results showed carbon nanotube rich material.

Carbon nanotubes were synthesized using the same setup, voltages and current densities as above, except HB mechanical pencil leads (graphite) of about 0.5 mm (0.02 inch), 0.7 mm (0.028 inch), 0.9 mm (0.035 inch), and 2.0 mm (0.079 inch) diameters and various lengths were used as anode 18.

EXAMPLE 2

Carbon nanotubes were prepared using EX-CELL-O Corporation electric discharge machine Challenger I, model 251 with an EX-CELL-O EDM power supply model 222-25-1 (0-100 V DC, 0-25 A, 250 Hz-500 KHz, duty cycle 10%-95% "ON" time, solid state). Dielectric oil by Rust-Lick Inc., RUSTLICK EDM-500 was used as dielectric liquid 12, serving as a dielectric (high dielectric constant of about 60 kV), coolant (low viscosity of about 3.17 cSt. at 40° C., specific gravity of about 0.8012 at 25° C., and high cooling rate of about 3270° C./s ), and oxygen-free environment (liquid with high oxidation resistance). Other liquids described in the prior art may be used instead of RUSTLICK EDM-500. A cylindrical EDM graphite piece (POCO Graphite EDM-1) from a used EDM electrode of about 25.4 mm (1 inch) diameter and about 12.7 mm (½ inch) height was used as cathode 16. A graphite rod (Spectroscopic electrode by National) of about 6.35 mm (¼ inch) diameter and about 304.8 mm (12 inch) starting length was used as anode 18.

After placing the electrodes in their respective holders, the EDM machine power supply is adjusted to about 20 V, 20 A (pulsating DC) at 50 KHz and 40% "ON" time. The resulting current density is about 0.25 A/mm$^2$ when the entire anode diameter is used in calculations. The NORMAL/REVERSE polarity switch is set to REVERSE polarity reflecting electrode positions as in FIG. 2 (cathode 16 and anode 18). ELECTRODE MATERIAL switch on the EDM is set to GRAPHITE. Then, servo 28 controlled by servo controller 30 is used to manually lower anode 18 within a few millimeters of cathode 16. Dielectric liquid 12 is entered into dielectric liquid tank 10 using pump 34 and filter 36, thus immersing both electrodes (cathode 16 and anode 18) into dielectric liquid 12. Then, the servo-controlled anode motion towards cathode 16 is started by depressing START CYCLE switch on the EDM. When the electrodes are moved close to each other an arc is struck between them. The arc discharges and gap 20 are maintained by the servo controls for the duration of the process, i.e. until the anode is depleted, the arc is distinguished, or a desired amount of carbon nanotube rich deposit is formed. At the end of the process, valve 42 was open to return dielectric liquid 12 into dielectric liquid reservoir 32.

A number of runs were performed. It was observed that the arc would be extinguished after about 10 minutes if the dielectric oil flow was not controlled by external means. Stirring the dielectric oil, or generating and controlling the oil flow between the electrodes by other means such as using a pump, allowed arc discharges to continue for over an hour.

The hard cathode deposits were cylindrical at about 5 mm diameter and of various lengths to about 30 mm depending on the process duration. After grinding and sonication in acetone the deposits were imaged using a TEM. The results showed carbon nanotube rich material.

CONCLUSIONS, RAMIFICATIONS, AND SCOPE

According to one embodiment of the invention, I have provided a more cost-effective and safer method than the methods disclosed in the prior art for production of high-quality carbon nanotubes in large quantities using a carbonaceous anode as the source of carbon whereby carbon nanotubes are synthesized in an electric field by striking an electric arc between two carbonaceous electrodes immersed in dielectric oil serving as a dielectric, coolant, and providing an oxygen-free environment.

According to another embodiment of the invention, I have provided a more cost-effective and safer method than the methods disclosed in the prior art for production of carbon nanotubes in electric discharge machines by supplying two carbonaceous electrodes immersed in dielectric liquid and setting the machine parameters favorable for synthesis of carbon nanotubes.

The above embodiments of the current invention have additional advantages in that
  a) they manufacture high-quality carbon nanotubes without the need for a closed or pressurized chamber;
  b) they manufacture high-quality carbon nanotubes without the need for one (or two) separate subsystems for cooling of electrodes;
  c) they manufacture high-quality carbon nanotubes without the need for an inert gas supply;
  d) they can use mass-produced and widely available electric discharge machines; and
  e) they can use non-carcinogenic dielectric liquids such as EDM dielectric oils.

Although the description above contains much specificity, this should not be construed as limiting the scope of any embodiment, but as exemplifications of the presently preferred embodiments thereof. Many other ramifications and variations are possible within the teachings of the various embodiments. For example, one skilled in the art could use x and y stages (manual or automatic) of an electric discharge machine to deposit carbon nanotubes on a larger surface of a cathode thus performing a "nanotube coating" of the cathode workpiece. Thus the scope of the invention should be determined by the appended claims and their legal equivalents, and not by the examples given.

I claim:

1. A process for manufacturing carbon nanotubes, comprising:
   a. providing at least two carbonaceous electrodes where at least one of said carbonaceous electrodes serves as the primary source of carbon; and
   b. providing a non-carcinogenic dielectric oil for immersing said carbonaceous electrodes; and
   c. providing means for varying the distance between said carbonaceous electrodes while said carbonaceous electrodes are immersed in said dielectric oil; then
   d. immersing said carbonaceous electrodes in said dielectric oil; and
   e. placing said carbonaceous electrodes in closely spaced-apart opposing positions with at least one electrode serving as an anode and at least one electrode serving as a cathode; then
   f. establishing an electric arc through said dielectric oil and between said carbonaceous electrodes and thus inducing an electric current through said carbonaceous electrodes;
   g. allowing said electric arc to continue thus producing carbon nanotubes from electrode material,
   whereby said dielectric oil provides an oxygen-free process environment and acts as a dielectric and a coolant, but not as a source of carbon,
   whereby high-quality carbon nanotubes are produced cost-effectively and in large quantities.

2. The process of claim 1, wherein said dielectric oil has high dielectric strength.

3. The process of claim 1, wherein said electric current is pulsating direct current with density between about 0.25 A/mm$^2$ and about 2 A/mm$^2$.

4. The process of claim 1, further comprising means for controlling a flow of said dielectric oil between said carbonaceous electrodes.

5. The process of claim 1, further comprising means for maintaining a gap between said carbonaceous electrodes between about 0.5 mm and about 2 mm for the duration of said electric arc.

6. The process of claim 1, wherein said electric current is direct current with density between about 1 A/mm$^2$ and about 2 A/mm$^2$.

7. A process for manufacturing carbon nanotubes in an electric discharge machine, comprising:
   a. providing at least two carbonaceous electrodes where at least one of said carbonaceous electrodes serves as the primary source of carbon; and
   b. providing a non-carcinogenic dielectric oil for immersing said carbonaceous electrodes in said electric discharge machine; and
   c. providing means for varying the distance between said carbonaceous electrodes while said carbonaceous electrodes are immersed in said non-carcinogenic dielectric oil; then
   d. immersing said carbonaceous electrodes in said non-carcinogenic dielectric oil; and
   e. placing said carbonaceous electrodes in closely spaced-apart opposing positions with at least one electrode serving as an anode and at least one electrode serving as a cathode; then
   f. establishing an electric arc through said non-carcinogenic dielectric oil and between said carbonaceous electrodes and thus inducing an electric current through said carbonaceous electrodes;
   g. allowing said electric arc to continue thus producing carbon nanotubes from electrode material,
   whereby said electric discharge machine will provide means for controlling carbon nanotube manufacturing conditions, and said non-carcingenic dielectric oil will provide an oxygen-free process environment while acting both as a dielectric and a coolant,
   whereby high-quality carbon nanotubes are produced cost-effectively and in large quantities.

8. The process of claim 7, wherein said electric current is pulsating direct current with density between about 0.25 A/mm$^2$ and about 2 A/mm$^2$.

9. The process of claim 7, further comprising means for controlling a flow of said non-carcinogenic dielectric oil between said carbonaceous electrodes.

10. The process of claim 7, further comprising means for maintaining a gap between said carbonaceous electrodes between about 0.5 mm and about 2 mm for the duration of said electric arc.

11. The process of claim 7, wherein said electric current is direct current with density between about 1 A/mm$^2$ and about 2 A/mm$^2$.

12. An electric discharge machine capable of producing carbon nanotubes comprising:
   a. non-carcinogenic dielectric oil, and
   b. at least two carbonaceous electrodes for immersion in said non-carcinogenic dielectric oil where at least one of said carbonaceous electrodes serves as an anode and at least one of said carbonaceous electrodes serves as a cathode, and
   c. means for varying the distance between said carbonaceous electrodes while said carbonaceous electrodes are immersed in said non-carcinogenic dielectric oil, and
   d. means for controlling a flow of said non-carcinogenic dielectric oil between said carbonaceous electrodes, and
   e. An electric power source providing voltages from about 15 V to about 45 V, for establishing an electric arc between said carbonaceous electrodes while said carbonaceous electrodes are immersed in said non-carcinogenic dielectric oil.

13. The apparatus of claim 12, wherein said electric power source is a direct current power source.

14. The apparatus of claim 12, wherein said electric power source is a pulsating direct current power source.

* * * * *